Figures 1, 2:
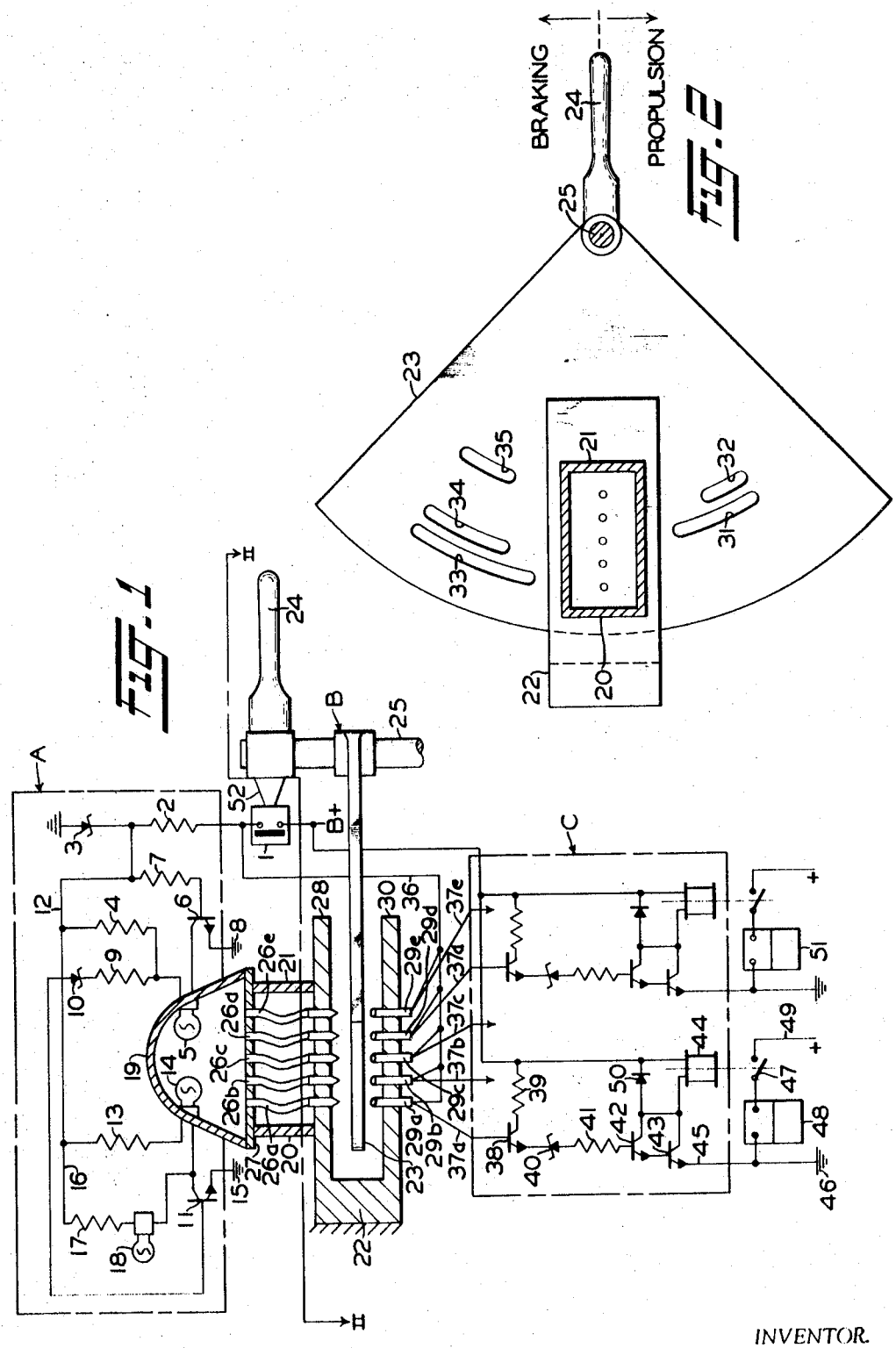

United States Patent

[11] 3,612,882

| [72] | Inventor | Charles W. Sheppard<br>Trafford, Pa. |
|---|---|---|
| [21] | Appl. No. | 854,685 |
| [22] | Filed | Sept. 2, 1969 |
| [45] | Patented | Oct. 12, 1971 |
| [73] | Assignee | Westinghouse Air Brake Company<br>Wilmerding, Pa. |

[54] CONTROL APPARATUS USING FIBER OPTICS AND HAVING DEENERGIZED LIGHT SOURCE WHEN HANDLE IS IN A NEUTRAL POSITION
3 Claims, 2 Drawing Figs.

[52] U.S. Cl. .................................................... 250/208,
250/227, 303/3, 317/127
[51] Int. Cl. .................................................... G02b 5/14,
H01h 47/24, H01j 39/12
[50] Field of Search .......................................... 250/208,
227, 229; 317/127; 315/93

[56] References Cited
UNITED STATES PATENTS

| 2,032,178 | 2/1936 | Logan, Jr. .................. | 250/208 X |
| 2,408,754 | 10/1946 | Bush ......................... | 317/127 X |
| 2,586,375 | 2/1952 | Pennow ..................... | 315/93 X |
| 3,213,179 | 10/1965 | Clauson ..................... | 250/227 X |
| 3,307,041 | 2/1967 | Kling ........................ | 250/229 X |

*Primary Examiner*—James W. Lawrence
*Assistant Examiner*—T. N. Grigsby
*Attorneys*—Adelbert A. Steinmiller and Ralph W. McIntire, Jr.

ABSTRACT: A photoresponsive control for use as a vehicle brake and propulsion control means whereby a light from a source is transmitted by fiber optic tubes to a manually operated control plate having variously located slotted openings to permit the light to selectively beam on or be shielded from various photoresponsive sensors which in turn control variations in the resistance of different control circuits and effect selection and functioning of various brake and propulsion controls of said vehicle.

PATENTED OCT 12 1971

3,612,882

INVENTOR.
CHARLES W. SHEPPARD
BY
*A. A. Steinmiller*
ATTORNEY

CONTROL APPARATUS USING FIBER OPTICS AND HAVING DEENERGIZED LIGHT SOURCE WHEN HANDLE IS IN A NEUTRAL POSITION

BACKGROUND OF INVENTION

Rapid transit vehicles are presently controlled by a manually operated controller having a cam-operated switch means operable by a handle means into various selected positions for effecting propulsion controls as desired and cam-operated self-lapping valve means for controlling the brakes. Although such controllers are satisfactorily utilized for controlling the rapid transit vehicles, it would be advantageous to have a controller with a lightweight compact construction utilizing a minimum of mechanically moving parts and having a rapid switching action from one functional position to another with a minimum of handle force.

SUMMARY OF INVENTION

According to the present invention, there is provided a compact controller means having a solid-state optical switching means with a low hysteresis of switching action for selective control of energization of various train wires to control braking and propulsion of rapid transit vehicles. The controller means comprises a source of light from which light is transmitted by a series of light-transmitting (fiber optic) tubes to a movable light shielding plate with selectively positioned slotted passages therein to selectively block said light beams or permit selected beams to pass through said passages and impinge on selected photoresponsive sensors. The resistance of the photoresponsive sensors varies sharply with the presence or absence of light beams thereon to effect interruption or completion of current supply to various transistors and diodes to actuate selected train line circuits as indicated by the location of the controller handle which selectively positions the shielding plate in accordance with the desired function. A fail-safe circuitry means is included with the lighting source.

In the accompanying drawing, FIG. 1 is a sectional view of the controller with the lighting source circuitry and a portion of the photoresponsive sensor circuitry for controlling energization of the train wires.

FIG. 2 is a view showing the shielding plate and the supporting bracket for the optic tubes as viewed at the plane II—II of FIG. 1.

DESCRIPTION

Referring to FIG. 1 of the drawing, there is shown a central apparatus including the controller means and associated lighting circuitry and control circuitry as would be located on the lead unit of a rapid transit train for selectively controlling the energization of the train wires that extend throughout the train. The apparatus as shown includes a lighting circuitry portion "A" shown at the top of FIG. 1, a shielding plate and handle portion "B" shown in the center of FIG. 1 and in FIG. 2, and a control circuitry portion "C" shown at the bottom of FIG. 1.

The lighting circuitry portion "A" includes a battery or power source shown as B+ which is supplied through a switch means 1, controlled by an operating handle as hereinafter described, to a resistor 2 and a Zener diode 3 which regulates the voltage by the breakdown action of the diode to in turn maintain a constant voltage via a resistor 4 and the primary light means 5 to transistors 6, (which is normally turned "on" via resistor 7) and thence to ground at 8, thereby energizing and illuminating the primary light source 5. Associated with the primary light-circuitry is the secondary or "backup" light-circuitry including a resistor 9 and a Zener diode 10 which are effective to turn "on" a transistor 11 only when the primary light 5 is burned out. An increase in voltage to the diode 10 because of failure of the light 5 causes so-called breakdown thereof of said diode to permit "turning on" of the transistor 11 and thereby completing circuitry via the B+ source switch means 1, resistor 2, wire 12, resistor 13, secondary light 14 and transistor 11 to ground at 15 to energize and illuminate light 14 during the period of time that light 5 is not operating. Connected in parallel with the secondary light 14 by wire 16 and resistor 17 is an indicating lamp 18 to give visual indication that the primary light 5 has failed and the secondary light 14 is operating.

Both the primary light 5 and the secondary light 14 are located within a reflecting dome or cavity 19 mounted by supports 20 and 21 to a fixed "U"-shaped mounting arm 22 through the center of which passes the shielding plate 23 in a circular movement as effected by the handle 24 and shaft 25 explained hereinafter. The reflecting dome 19 is formed with a particular geometric shape to provide the maximum reflecting capability in a downward direction to a plurality of fiber optic light conducting tubes 26a, 26b, 26c, 26d and 26e, the number of which is dependent on the number of selective functions desired to be performed as explained hereinafter. The light tubes 26a–26e extend from a fixed bottom plate 27 of the dome 19 to spaced linear positions in the upper arm 28 of the "U"-shaped mounting bracket 22 of the handle portion "B," so as to be in alignment with a plurality of photoresistive sensors 29a, 29b, 29c, 29d, and 29e on the lower arm 30 of the "U"-shaped mounting bracket 22. Thus the light emitted from the tubes 26a–26e beams on the respective sensors 29a–29e under the control of the movable light shielding plate 23. The light shielding plate 23 can be of any convenient shape to pass between the arms 28 and 30 of the "U"-shaped mounting bracket 22, shown herein in FIG. 2 as a circular segment with arcuate slots of varying length 31, 32, 33, 34 and 35 therein through which the beams from the light tubes 26a–26e may selectively pass through to the selected sensors 29a–29e in accordance with the location of the slots as effected by the manual positioning of the plate 23. It should be noted that configuration of the slots in the plate and the light tubes and sensors can be programmed to different logic results by the number and location of slots and sensors to serve the desired functions at the desired position of the plate 23 by different positions of the handle 24, as for example alignment of a light tube and a sensor through slots 31 and 32 effecting different degrees of propulsion control and alignment of light tubes and respective sensors through slots 33–35 effecting different braking control functions such as energizing release, application and emergency braking circuitry as explained hereinafter.

The sensing and power circuitry as shown in the control circuitry portion "C," is selectively rendered effective to serve a control function in accordance with the selective exposure to light beams on the photoresistive sensors 29a–29e in the mounting arm 22 according to the selective positioning of the handle 24 and shield 23 as explained herein.

The photoresistive sensors 29a–29c are standard electronic devices of which the electrical resistance to current flow therethrough decreases very significantly when subject to light rays. The photoresistive sensors 29a–29c shown in FIG. 1 are all supplied with a voltage potential from the "B" source via the switch means 1 and a supply wire 36 to their respective function circuitry, only two of which are shown and described herein for simplicity purposes.

When the handle 24 is manually positioned to place the shielding plate 23 in a position to expose the photoresistive sensor 29a to the light tube 26a through the slot 31 for example, the sensor 29a reacts in such a manner that the resistance thereof is greatly reduced to permit an increased current flow therethrough from the B+ source via the switch means 1 and supply wire 36 to the distributing wire 37a to a transistor 38. This increased voltage supply to transistor 38 permits it to turn on or conduct and supply a potential from the supply wire 36 distributing wire 37a and resistor 39 to effect so-called "breakdown" action of the Zener diode 40 supply and potential via resistor 41 to permit conduction through or so-called "turning on" of the Darlington configuration of transistors 42 and 43. With transistor 43 "turned on" the relay 44 is energized via the supply wire 36, the winding of relay 44, transistor 43 and wire 45 to ground at 46, to pick up and close the contact member 47 thereof and in turn effect energization and functional operation of the magnet valve 48 via the supply source at 49, closed contact 47, the winding of magnet valve 48 and wire 45 to ground at 46. Energization of magnet valve 48, which in this instance could be the usual train line controlled release magnet valve, effects a desired control function to effect operational control of the braking throughout the train. A surge protecting diode 50 is inserted in the circuitry of transistor 42 to protect against any inductive transient surges when the transistor 42 is "turned off."

The circuitry for each photoresistive sensor 29a–29c is identical for energizing the distributing wires 37a–37e when the respective sensor is subject to a beam of light; however, for simplicity of description only two of a possible five circuits are shown herein with a single description that serves to describe similar circuitry for functionally selectively energizing magnet valves similar to 48 and 51 for controlling energization of different train lines for brake and propulsion control of the train. It should be noted that with the use of additional light tubes, photoresistive sensors and slots on the shield 23, additional functions may be served by energization of additional magnet valves. For simplicity of description only magnet valves 48 and 51 are shown, these two representing the usual brake release magnet valve 48 and a propulsion control magnet valve 51, the operation of which is explained hereinafter.

Operation

In operation, with the operating handle positioned in a neutral position in which it is shown, the cam-operated switch means 1 is opened. When the handle is moved in either direction away from the central or neutral position, switch means 1 is instantly closed by movement of the cam 52 and maintained closed in an operating arc area as defined by the arc area of the shielding plate 23. The switch means 1 is closed to effect illumination of the primary light-source 5 or in the event of failure of light source 5 to effect illumination of the secondary light-source 14 in a manner described hereinbefore. Moving the handle 24 in a "propulsion" direction as indicated by the arrow in FIG. 2 will rotate the plate 23 between the mounting arm 22 such that the lost 31 and 32 can selectively align the light rays that the slots 31 and 32 can selectively align the light rays from the selected fiber optic tubes 26a and 26d with selected sensors (29c and 29d) through the said slots to selectively energize the control circuitry from distributing wires 37c and 37d to in turn selectively energize propulsion control magnet valves (only one of which magnet valve 51 is shown), to result in different degrees of propulsion of the vehicle via energization of selected train lines (not shown). Movement of the handle 24 in the opposite or "breaking" direction as shown by the arrow in FIG. 2, will rotate the plate 23 between the mounting arm 22 such that slots 33, 34 and 35 can selectively align the light beams from selected fiber optic tubes 26a, 26b and 26e with selected fiber sensors 29a, 29b and 29e, respectively to selectively energize the control circuitry from wires 37a, 37b and 37e to, in turn, selectively energize braking control magnet valves (only one of which is shown, magnet valve 48) to result in different degrees of braking of the vehicle via energization of selected train wires (not shown).

It can thus be seen that selective energization of the different control magnet valves may be effected very rapidly with a minimum of moving parts to effect selectively different degrees of braking or propulsion control.

Having now described the invention what I claim as new and desire to secure by Letters Patent, is:

1. A control apparatus including an operating handle shiftable into a plurality of different positions including at least one control position and a neutral position and means responsive to movement of the handle in said control position to effect different control functions, wherein the improvement comprises:
   a. a source of energy,
   b. switch means having a first condition provided in accordance with said handle being disposed in said neutral position whereby said source of energy is deactivated and having a second condition provided in accordance with said handle being moved out of said neutral position whereby said source of energy is activated,
   c. conducting means for selectively conducting the energy from said source to different locations,
   d. sensor means individually located relative to said conducting means to receive the energy therefrom,
   e. control means responsive to supply of said energy to said sensor means for producing selected control signals to effect desired control functions, and
   f. means for selectively communicating the energy from said conducting means to said sensor means in accordance with the position of the handle.

2. A control apparatus including an operating handle shiftable into a plurality of positions including at least one control position and a neutral position and means responsive to movement of the handle in said control position to effect different control functions wherein the improvement comprises:
   a. a source of light including,
      i. primary light-source means normally operative to effect emission of light rays,
      ii. secondary light-source means operative to effect emission of light rays,
      iii. circuit means for automatically rendering said secondary light-source means inoperative when said primary light-source is operative and rendering said secondary light-source beams is inoperative, and
      iv. signal means for indicating which of said primary or secondary light-source means is operable,
   b. switch means operable in response to movement of the handle out of said neutral position to establish circuitry for providing said source of light,
   c. a plurality of fiber optic tubes for selectively conducting the rays from said source of light to different locations.
   d. light responsive sensor means corresponding in number to said fiber optic tubes and individually located in alignment with said fiber optic tubes to receive the light rays therefrom,
   e. shielding plate means interposed between said fiber optic tubes and said sensor means for selectively passing or interrupting the light rays from said fiber optic tubes to the sensor means according to the position of the operating handle in said control position, and
   f. means responsive to supply of light rays to said sensor means for producing selected control signals to effect said different control functions.

3. Control apparatus as recited in claim 2 further characterized in that said switch means is normally open in consequence of said handle being disposed in said neutral position and being operable to a closed position by movement of said handle out of said neutral providing said source of light.

PO-1050
(5/69)

UNITED STATES PATENT OFFICE
CERTIFICATE OF CORRECTION

Patent No. 3,612,882            Dated October 12, 1971

Inventor(s) Charles W. Sheppard

It is certified that error appears in the above-identified patent and that said Letters Patent are hereby corrected as shown below:

Column 4, line 37, after "light-source" insert --means-- line 38, erase "beams" and insert --means operative when said primary light-source means-- line 62, after "neutral" insert --position in either direction to establish circuitry for--

Signed and sealed this 25th day of April 1972.

(SEAL)
Attest:

EDWARD M. FLETCHER, JR.
Attesting Officer

ROBERT GOTTSCHALK
Commissioner of Patents